July 5, 1938.  H. J. WADDELL  2,122,667
STOP VALVE
Filed Jan. 4, 1937
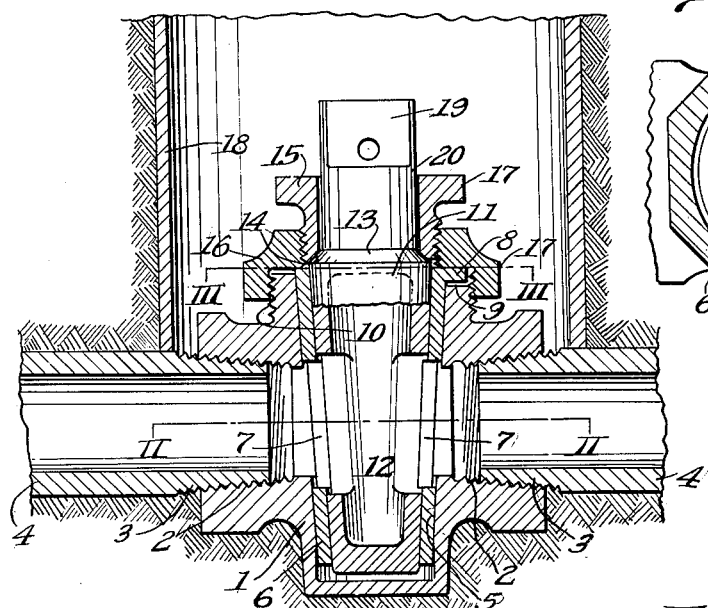
Inventor
Homer J. Waddell
W. J. M. Powell
Attorney Patented July 5, 1938

2,122,667

UNITED STATES PATENT OFFICE 2,122,667

STOP VALVE

Homer J. Waddell, Baltimore, Ohio

Application January 4, 1937, Serial No. 118,935

3 Claims. (Cl. 251—103)

This invention relates to improvements in valves, and has particular reference to an improved valve especially adapted for use in connection with street service boxes for the control of fluid passing through underground conduits, as, for instance, in the regulation of gas or water service in municipalities.

The conventional valve employed in connection with such service is of the tapered plug type wherein the plugs are mounted for turning movement in conical body sockets, the plugs being maintained in such sockets or seats by means of threaded devices connected with the lower ends of the plugs and engaging with the under sides of the valve bodies. Such valves tend to develop leaks and it is necessary from time to time to replace the same with newer and properly operating valves. The replacement of such valves involves considerable work and labor in the form of earth excavations to provide access to the valves, the cutting of pipe with which the valve bodies have threaded connections, the use of coupling sleeves to replace removed pipe and, frequently, the complete loss of the worn devices so replaced.

It is therefore an object of the present invention to provide a stop valve for underground service which may be quickly and easily repaired and worn parts replaced with but a minimum of labor and repair expense.

It is another object of the invention to provide a stop valve including a rotatable conical plug which may be inserted into and removed from the associated valve body without requiring removal of the latter from its secured position upon a pair of communicating pipes.

A further object of the invention resides in the provision of a valve for the uses set forth wherein the conical plug member is rotatably mounted in a stationary but removable sleeve positioned in the plug socket of the valve body, and wherein a tightening nut is provided in connection with the upper portion of the valve body which serves to maintain the valve plug in positive rotatable contact with the inner surfaces of the removable sleeve or thimble in which it is positioned, the arrangement of parts being such that the securing nut, the sleeve or thimble and the plug member may be operatively positioned within the valve body or removed therefrom through an opening communicating with the top of the valve body.

A still further object of the invention resides in the provision of an improved means for effecting the lubrication of the rotary valve plug in the socket of the removable sleeve or liner in which it is contained, the said means comprising lubricant receiving recesses or slots formed in the sleeve or liner and so disposed as to prevent the scoring or grooving of the contacting surfaces of the sleeve or liner and the valve plug to such an extent as to produce fluid leaks through the valve.

The present invention constitutes a continuation-in-part of the disclosures contained in my prior application, Serial No. 74,974 filed April 17, 1936 for improvements in Stop valve.

For a further understanding of the invention, reference is to be had to the following description and the accompanying drawing, wherein:

Fig. 1 is a vertical sectional view taken through the valve comprising the present invention and illustrating the same as used in connection with an associated curb service box;

Fig. 2 is a horizontal sectional view taken through the valve on the plane indicated by the line II—II of Fig. 1;

Fig. 3 is a similar view taken through the upper portion of the valve on the plane disclosed by the line III—III of Fig. 1;

Fig. 4 is a detail perspective view of the removable lining sleeve of the valve;

Fig. 5 is a similar view of the rotatable plug member.

In the specific embodiment of the invention, as illustrated in the accompanying drawing, the numeral 1 designates the body of the valve. Usually, this body is formed from cast metal and is provided with longitudinally aligned, relatively communicating threaded openings 2 for the reception of the threaded ends 3 of a pair of communicating fluid pipes or means 4. The vertical axial portion of the valve body is formed to include a downwardly tapering socket 5, communicating on opposite sides with the openings 2, and in which socket there is removably positioned a sleeve or liner 6, formed from a corrosion resisting metal, such as a brass alloy. The sleeve or liner 6 closely conforms to the dimensions of the socket 5, and as shown in Fig. 4, the same comprises a conical tubular body having the opposite side walls thereof formed with ports 7 which register with the openings or fluid passages 2 provided in the body 1. The sleeve or liner may be inserted within the body of the valve through the open top of the socket 5, and is held against axial rotation by the provision of a laterally extending lip 8, formed with the upper annular edge of the sleeve or liner, the said lip being received within a recess or notch 9 provided in the upper edge of the externally threaded collar 10, which forms an integral part of the valve body.

Rotatably positioned within the sleeve or liner is a valve plug 11 which is also of the tapered or conical type and is composed of a corrosion-resisting metal similar to that from which the sleeve or liner 6 is formed. The plug is provided with the usual transversely extending passage 12 which, upon the rotation of the plug, may be brought into and out of registration with the ports 7 of the sleeve or liner and the passages 2 of the valve body. The upper portion of the plug 11 includes a ground or machined seating surface 13 with which engages a correspondingly formed beveled surface 14 provided upon the lower end of an inner ring nut 15. This nut is externally threaded for removable reception within the internally threaded region of an outer ring-nut 16, which latter has engagement with the external threads provided upon the outer wall of the collar 10. By tightening the ring nut 15, positive engagement exists between the surfaces 13 and 14 to prevent fluid leakage, and at the same time, the plug is forced downwardly into the tapering socket provided therefor in the sleeve or liner 6. Also, the outer nut 16 positively holds the sleeve or liner 6 against upward movement within the valve body. The exteriors of both the ring-nuts 15 and 16 are provided with polygonal wrench-receiving surfaces 17.

With the use of the valve comprising the present invention, the plug and liner may be removed from or inserted into the valve body as a unit, and without requiring the removal of the valve body from the pipe lines associated therewith or earth excavations in order to reach the valve. The ring-nuts, through the employment of a socket wrench, may be readily removed from the top of a stop valve casing of the type indicated at 18, and a lifting tool may then be applied to the reduced bar-shaped upper end 19 of the plug stem 20. The lifting of the valve plug may then be effected to cause its removal through the enlarged and open upper end of the socket 5. Usually there is sufficient friction between the plug and the liner so that the liner is removed simultaneously from the valve with the plug. If not, however, the liner may be separately removed. Reverse of this operation takes place when a renewed plug or liner is inserted into a valve body disposed in the bottom of a stop valve casing. During this operation, the lip 8 is engaged with the notch or recess 9 so that the operator will be assured that the liner is so positioned that its ports 7 will register with the passageways 2 of the valve body, thus holding the liner against rotation when the valve plug is rotated. Also, by noting the positions of the reduced bar-shaped upper end 19 of the plug stem, the operator will likewise be apprised as to the relationship of the passageway 12 of said plug with the ports 7 and the passageways 2 of the valve body.

Another important feature of the invention resides in providing the sleeve or liner 6, between the ports 7 thereof, with elongated slots or recesses 21. These slots or recesses are adapted to receive a grease or lubricant so that the turning of the valve plug will cause the lubricant to be positioned between the contacting surfaces of the liner and plug and thus to minimize wear therebetween. Also, due to the location of these recesses or slots, if abrasive solids should find their way between the adjoining surfaces of the plug and liner, the rotation of the plug will cause the advancement of these particles only so far as the slots 21 in which such particles will be lodged, thus preventing such particles from further scoring the said contacting walls the full distance between the ports 7 as is the case in valves of ordinary construction and which condition is one of the major contributing causes to valve leakage.

In stop valves constructed in accordance with the present invention, pressures of the order of several hundred pounds per square inch may be maintained thereon for sustained periods of time without leakage or fluid stoppage therethrough. Maintenance costs are considerably reduced over the usual type of stop valve employed in connection with underground means. The liner or sleeve and the valve plug may be manufactured as a unit separately from the valve body and accurate fitting engagement between the mutually contacting surfaces thereof readily obtained. Such a unit may be inserted into or removed from the valve body in but a few minutes time, avoiding the costs heretofore occasioned in valves of ordinary construction which frequently require the making of an excavation in the region of the valve to obtain access thereto, the cutting of pipe and other incidental operations which develop high maintenance costs.

What is claimed is:

1. A service controlling valve for underground fluid mains comprising a valve body formed with a longitudinally extending passage and an intersecting perpendicularly extending tapered socket extending through the valve from top to bottom, a lining sleeve tapered to conform with the configuration of said socket and to closely engage the walls thereof, said sleeve being open at its upper end and provided with ports arranged in registration with the longitudinal passageway extending through the valve body, a tapered plug rotatably mounted in said lining sleeve and provided with a longitudinal port adapted to be brought into and out of registration with the ports in said sleeve and the passageway of said body through the rotation of the plug about its vertical axis, said plug being provided above the upper edge of said sleeve with an annular shoulder and an exteriorly projecting actuating stem, an inner ring-like clamping nut rotatably surrounding said actuating stem and contacting with said shoulder, an outer ring nut removably carried by said valve body, said inner nut being exteriorly threaded for engagement with threads internally formed in said outer ring nut whereby to removably retain said plug and lining sleeve in their operative positions within said body, the removal of said ring nuts from threaded engagement with said body serving to permit of the bodily removal of the plug and lining sleeve from said body without disturbing the applied position of the latter on the ends of a pair of communicating fluid pipes, and shouldered means formed with and serving to prevent rotation of said lining sleeve when operatively positioned within the valve body.

2. A stop valve comprising a valve body formed with a longitudinally extending passage and an intersecting perpendicularly disposed tapered socket, the upper end of said body around said socket being exteriorly threaded, a tapered apertured lining sleeve removably positioned within said socket in close engagement with the surfaces of the latter, the upper end of said sleeve terminating above the horizontal plane defining the upper end of said body, a tapered plug rotatably mounted in said sleeve, said plug being provided with a port adapted for registration with the passageway of the valve body and the apertures of said sleeve, said plug being formed above the upper end of said sleeve with an annular shoulder and an exteriorly projecting actuating stem, a primary and outer ring-like nut having threaded engagement with the exterior threads formed on said body, said nut being internally shouldered for engagement with the projecting upper end of said sleeve to force the latter into firm seating engagement with the wall surfaces of said socket, and an inner and secondary clamping nut surrounding the actuating stem of said plug, said secondary nut having threaded engagement with internal threads formed in the primary nut, the inner end of the secondary nut engaging with the annular shoulder formed on said plug to maintain the latter in seating engagement with the inner surfaces of said lining.

3. A stop valve as defined in claim 2 and further characterized by the provision of wrench-receiving surfaces on the exterior of the primary and secondary clamping nuts, the said surfaces being disposed in different horizontal planes.

HOMER J. WADDELL.